United States Patent Office 3,216,769
Patented Nov. 9, 1965

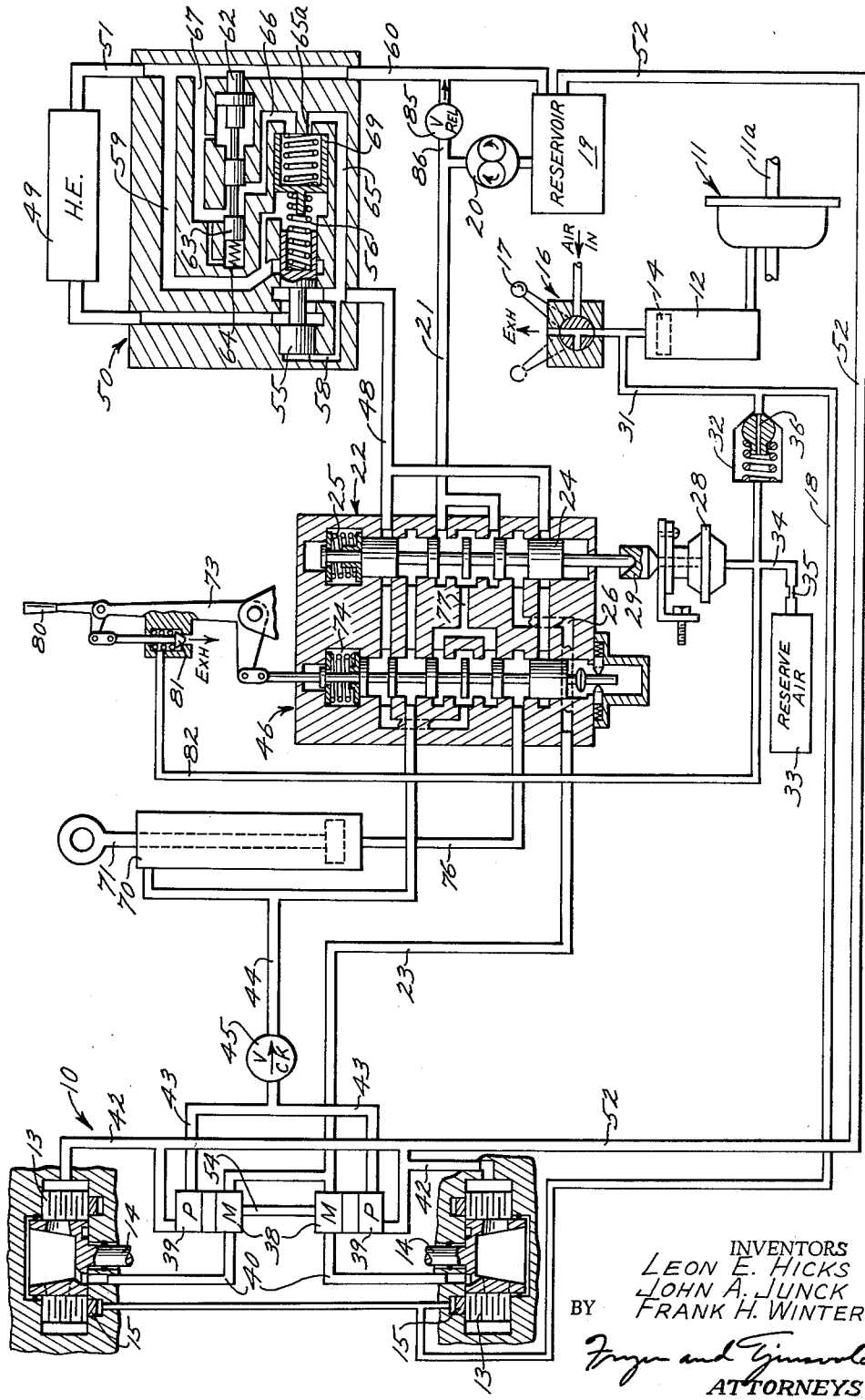

3,216,769
FLUID SYSTEM AND CONTROLS FOR ACTUATION OF VEHICLE COMPONENTS AND COOLING OF BRAKES
Leon E. Hicks, John A. Junck, and Frank H. Winters, Joliet, Ill., assignors to Caterpillar Tractor Co., Peoria, Ill., a corporation of California
Filed July 1, 1963, Ser. No. 291,947
7 Claims. (Cl. 303—6)

This invention relates to improvements in the fluid circuits of large vehicles in which components including brakes are cooled by liquid to dissipate the heat of friction occurring during sustained or rigorous application of the brakes.

Because of the heavy service to which brakes on large vehicles are subject, hydraulic retarders are frequently used in combination with mechanical or disc-type brakes and it is desirable upon extended downhill operation to employ the retarder and brake by the application of air under pressure to both. With liquid-cooled brakes a supply of cooling liquid should be directed through the brakes continuously during their application and preferably for a brief period after they are released to dissipate residual heat.

It is therefore an object of the present invention to provide circuits and means to effect simultaneous application of air under pressure to actuate a retarder and brakes of a vehicle and at the same time to open a valve for admitting cooling fluid under pressure to the brakes and also to provide means to delay the closing of said valve after the brakes are released and the retarder is de-energized.

It is also desirable in liquid-cooled brakes to prevent the build-up of coolant pressure in the brakes where it might interfere with proper braking and damage oil seals, and to prevent excessive pressure in heat exchangers required for removing heat acquiring by the coolant which has circulated through the brakes.

It is, therefore, another object of the invention to provide an improved means for scavenging coolant from the brakes, to direct it through a suitable heat exchanger and also to provide means to protect the heat exchanger by bypassing coolant at excessive pressures or temperatures below a value where cooling is necessary.

The present invention employs a fluid system in which the same oil and pressure means employed for cooling the brakes are employed for the actuation of hydraulic motors on other components such, for example, as the jacks for elevating a dump body on a truck or dump wagon.

It is, therefore, another object of the invention to provide means to insure full available pressure to hydraulic motors when necessary by automatically shutting off flow of oil to the brakes upon direction of oil to a hydraulic motor for actuation thereof.

Still further and more specific objects and advantages of the invention and the manner in which they are carried into practice are made apparent in the following specification wherein reference is made to the accompanying drawing.

The drawing is a schematic diagram of a system and controls therefore embodying the present invention.

The system illustrated in the drawing comprises a pair of vehicle wheel brakes generally indicated at 10 and a fluid-type retarder generally indicated at 11, the latter being of the type disclosed in our assignee's U.S. Letters Patent to Sieving et al. No. 3,057,666. The retarder is associated with a vehicle drive shaft indicated at 11a and is charged with fluid from a reservoir 12 to which air may be introduced for moving a floating piston 14 downwardly therein for forcing oil from the reservoir into the retarder housing. The brakes 10 are also actuated by air and each of the brakes which are identical comprises a plurality or stack of discs 13 acting in a well-known manner to provide braking friction to an axle 14 when the discs are compressed by air exerted behind an annular piston 15. Air from a suitable source under pressure is controlled by a valve generally indicated at 16 so that, upon movement of a valve lever 17 from the full line to the broken line position shown, pressure is directed simultaneously into the reservoir 12 to actuate the retarder and through a line 18 to actuate the brakes by directing the air into the chambers behind the pistons 15. It is desired that cooling fluid, preferably oil, be directed through the brakes and between the discs thereof which are generally grooved for that purpose and the present invention provides means to initiate such flow of oil and continue the flow during the time that the retarder and brakes are applied. Oil for this purpose is contained in a reservoir 19 and directed by a pump 20 through a line 21 and a valve generally indicated at 22 to the brakes by a conduit 23. The valve 22 is of the spool type having a spool 24 normally held in a neutral or closed position by a conventional centering spring assembly 25. Upward movement of the spool provides communication between the lines 21 and 23 by permitting flow through a passage 26 in the valve housing. The spool 24 is moved upwardly to effect this communication automatically upon actuation of the retarder and the brakes by an air cylinder or servo 28 acting upwardly through a piston 29 on the stem of spool 24. Application of air through the valve 16 for actuating the brakes and retarder also directs air through a line 31 and check valve 32 to the servo 28.

Since the brakes may contain considerable residual heat immediately after their release, it is desirable that the flow of cooling oil directed therethrough be continued for a brief period. This is accomplished by means of reserve air in a reservoir 33 which is charged during the application of the brakes since it is in communictation with the same line that serves the servo 28 by means of a branch line 34. The branch line 34 has a restricted orifice 35 therein and there is also a restricted orifice in the valve element of the check valve 32 as indicated at 36. Thus, after the control valve 16 is moved to its shut-off position illustrated, to exhaust air in the line 31 which actuates the retarder and brakes, the reserve air in reservoir 33 is exhausted through the restricted orifice 35 to provide pressure sufficient to hold the valve 22 in its open position by means of the servo 28. This pressure prevails for a limited period of time since it is permitted to escape back to exhaust through a smaller restricted orifice 36 in the valve 32. Consequently, cooling oil is circulated for a limited time through the brakes after their disengagement and the duration of this time may be varied by selection of the size of the orifices 35 and 36.

It is desirable to prevent building up of excessive pressure in the brake housings since cooling oil under high pressure may tend to separate the stack of brake discs, resulting in poor braking, or may tend to destroy seals which are required to maintain the housing fluid tight. To accomplish this, the conduit 23 is divided to direct flow through a pair of fluid motors 38 coupled with a pair of fluid pumps 39. Therefore, oil pressure through conduit 23 actuates the fluid motors and fluid pumps and the exhaust from the motors is directed to the brake chambers through identical lines 40. After flowing through the brake housings and between the discs in the stacks 13, the pumps 39, actuated by the motors 38, exhaust the oil through lines 42, one for each brake, and direct it through lines 43 to a common return line 44 which includes a check valve 45 to prevent passage of oil from the jack circuit, later to be described, into the brake circuit. This common return line leads to a hydraulic control valve generally indicated at 46, shown as contained in the same housing with the valve 22, the purpose of which will presently be described in detail. The return oil flows directly through the valve 46 and to the valve 22 through the passages indicated on the drawing and since the valve 22 is in its raised or open position during circulation of cooling oil, the return is communicated to a line 48 and to a heat exchanger 49 through a bypass valve generally indicated at 50 and also presently to be fully described. Oil cooled in the heat exchanger is directed through a line 51, through the bypass valve and back to the reservoir 19.

The quantity of fluids to be cooled in the heat exchanger is desirably kept at a minimum since excessive pressures tend to be destructive and also cause unnecessary burden of the heat exchanger with oil that is essentially below a temperature which requires cooling. It is also undesirable to pass oil through the delicate tube structure of a heat exchanger when it is relatively viscous due to low temperature since the flow of the more viscous oil through the heat exchanger tends to create destructive back pressures. Any such back pressures in the heat exchanger would also tend to impair successful scavenging of the brake chambers. In this connection it should be pointed out that the motor 38 and pumps 39 are provided to insure reasonable scavenging of the brake chambers and since the motors and pumps are inherently inefficient, only partial scavenging is effected by the pumps. For example, where vane-type motors and pumps are employed, an inefficiency of approximately 10% may be expected in each motor and in each pump so that the pumps may be relied upon to scavenge approximately 80% of the cooling oil directed into the brake chambers by the motors. The remaining 20% in volume is returned directly to the reservoir 19 by a line 52. The motors are preferably connected to a common shaft 54 to which their rotors are fixed so that they operate in unison and at the same speed, insuring that equal volumes of coolant is directed to both brakes.

Referring back to the bypass valve 50, this valve is responsive to excessive pressures in the return line 48 and will vent such excessive pressure directly to the reservoir 19. A pool 55 is urged to the position illustrated by a spring 56 permitting communication between the line 48 and the heat exchanger 49. When pressure entering the valve exceeds a predetermined maximum, it is communicated through a passage 58 to the end of the spool 55 urging it toward the right as illustrated against the force of spring 56, closing the passage to the heat exchanger and opening a passage 59 in the valve which communicates with the return to the reservoir as through a line 60. Temperature of oil returned to the reservoir is sensed by an expandable thermostatic element 62 which acts upon the stem of a valve spool 63 urged in a rightward direction as shown by a spring 64. The thermostatic element 62 is illustrated in its relatively cold-oil position and some of the return oil entering the bypass valve passes through a passage 65, an orifice 65a and a passage 66 where it is vented through the bore of spool 63 and a passage 67 to the return line 60, meanwhile passing through the spring chamber of a load piston 69 arranged to load the spring 56 of the valve spool 55. In the event that the oil temperature increases, the thermostatic element 62 expands, urging the spool 63 to the left to close communication between passages 66 and 67, thus increasing pressure on the load piston 69 and increasing load on the spring 56. This tends to close valve 55 which has been held open by pressure in passage 58 and thus to restrict or prevent flow from line 48 to the bypass passage 59. Consequently, a considerably greater pressure of hot oil is required to actuate spool 55 toward the right to its bypass position. The bypass valve 50, therefore, tends to protect the heat exchanger against cold viscous oil which does not require cooling and against excessive pressures regardless of the temperature of the oil.

The oil under pressure from reservoir 19 and pump 20 in addition to being used for cooling of the brakes as hereinabove described may be employed for the actuation of other vehicle components which are hydraulically controlled such, for example, as the hydraulic jack employed to impart dumping movement to the body of a truck or wagon. Such a jack is schematically illustrated at 70 as having a piston and piston rod 71, extension of which imparts dumping action to the vehicle body. The control valve 46 directs oil under pressure from the pump 39 to the head end of the jack 70 for this purpose. To accomplish this, a lever 73 is manipulated to move the spool of valve 46 downwardly against the neutralizing effect of a spring assembly 74 to effect communication between line 21 and line 76. Since the valve 22 is of the open center type, the pressure is communicated directly therethrough to a passage 77 and thence to the line 76 to which access is effected by the upward movement of the spool in valve 46. Since it is necessary for control valve 22 to be in the neutral position shown in order to communicate pressure through valve 46 to the head end of the jack it is, in accordance with the present invention, automatically returned to its neutral position upon movement of the control lever 73 to the right which opens the valve 46 to actuate the jack. This is accomplished by an auxiliary lever 80 pivoted to the upper end of lever 73 and operable upon actuation of the lever 73 to open an exhaust valve 81 in a line 82 which communicates with the air circuit previously described. Thus, any air in such circuit tending to actuate the servo 28 is instantly exhausted, permitting return of valve spool 24 to its neutral position under influence of the centering spring assembly 25.

A relief valve shown at 85 is disposed in a bypass 86 communicating between the pump 20 and the return line 60 to relieve to the reservoir excessive pressures in the hydraulic system.

We claim:

1. In a vehicle brake system wherein cooling fluid under pressure is circulated through a brake housing while the brake is engaged, a pump communicating with the brake housing for scavenging at least a portion of said cooling fluid therefrom and a motor for driving said pump, said motor being driven by said cooling fluid under pressure before it enters the brake housing.

2. The combination of claim 1 including more than one brake, a motor and pump for each brake, and means connecting all motors for synchronous operation to insure delivery of an equal volume of fluid to each brake.

3. The combination of claim 2 including means for directing the output of said pumps to a source of said cooling fluid, and separate means for communicating flow of fluid in excess of the pump capacity from the brakes to the source.

4. The combination of claim 3 including a heat exchanger through which fluid may flow from the brakes to the source, means bypassing the heat exchanger, and a pressure sensitive valve in said bypass responsive to excessive pressure to open the bypass.

5. The combination of claim 3 including a heat exchanger through which fluid may flow from the brakes to the source, means bypassing the heat exchanger, and a temperature responsive valve in said bypass responsive to low temperature to open the bypass.

6. In a vehicle which comprises brakes, an air pressure system for engaging the brakes, a hydraulically actuated vehicle component, a source of hydraulic fluid for actuating said component, means to direct fluid from said source through the brakes as a coolant, a first valve controlling flow of said fluid to the brakes, a second valve controlling flow of fluid to said component actuating means, means in the air pressure system to open the first valve when the brakes are engaged, and means operable upon opening of the second valve to insure closing of the first valve.

7. The combination of claim 6 in which the first valve is spring closed and opened by pressure in the air system, and a vent valve in the air system operable upon opening of the second valve to exhaust pressure therefrom.

References Cited by the Examiner
UNITED STATES PATENTS

| | | | |
|---|---|---|---|
| 960,355 | 6/10 | Levin | 188—264 X |
| 1,637,382 | 8/27 | Leipert | 188—264 |
| 2,127,557 | 8/38 | Ells | 188—264 |
| 2,355,484 | 8/44 | Teker | 188—264 X |
| 2,917,137 | 12/59 | Kelley | 188—264 |
| 2,926,737 | 3/60 | Fischer | 188—264 X |
| 3,042,155 | 7/62 | Kelley | 188—264 |
| 3,047,104 | 7/62 | Schjolin | 188—264 |
| 3,057,666 | 10/62 | Sieving et al. | 303—8 |
| 3,101,815 | 8/63 | Thompson et al. | 188—264 |

FOREIGN PATENTS 654,250   12/62   Canada.

ARTHUR L. LA POINT, *Primary Examiner.*

EUGENE G. BOTZ, *Examiner.*